United States Patent
Fröberg Olsson et al.

(10) Patent No.: US 10,469,196 B2
(45) Date of Patent: Nov. 5, 2019

(54) CHECK POSITIONS WITHIN A TRANSPORT BLOCK

(71) Applicant: Telefonaktiebolaget LM Ericsson (publ), Stockholm (SE)

(72) Inventors: Jonas Fröberg Olsson, Ljungsbro (SE); Svante Bergman, Hägersten (SE); Erik Eriksson, Linköping (SE); Pål Frenger, Linköping (SE); Martin Hessler, Linköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 232 days.

(21) Appl. No.: 15/539,211

(22) PCT Filed: Aug. 10, 2016

(86) PCT No.: PCT/EP2016/069045
§ 371 (c)(1),
(2) Date: Jun. 23, 2017

(87) PCT Pub. No.: WO2018/028774
PCT Pub. Date: Feb. 15, 2018

(65) Prior Publication Data
US 2018/0241501 A1  Aug. 23, 2018

(51) Int. Cl.
*H04L 1/00* (2006.01)
*H04W 76/27* (2018.01)
*H04W 72/12* (2009.01)

(52) U.S. Cl.
CPC .............. *H04L 1/0009* (2013.01); *H04L 1/00* (2013.01); *H04L 1/0006* (2013.01); *H04L 1/0061* (2013.01); *H04W 72/1289* (2013.01); *H04W 76/27* (2018.02)

(58) Field of Classification Search
CPC ....... H04L 1/0009; H04L 1/00; H04L 1/0006; H04L 1/0061; H04W 76/27; H04W 72/1289
See application file for complete search history.

(56) References Cited

U.S. PATENT DOCUMENTS

| | | | |
|---|---|---|---|
| 8,687,745 B2* | 4/2014 | Lindoff | H04L 1/0091 375/341 |
| 2009/0154607 A1* | 6/2009 | Lindoff | H04L 1/0038 375/341 |
| 2009/0185638 A1* | 7/2009 | Imamura | H04L 1/0009 375/298 |

(Continued)

FOREIGN PATENT DOCUMENTS

| | | |
|---|---|---|
| EP | 1432261 A1 | 6/2004 |
| EP | 2086143 A3 | 4/2012 |

*Primary Examiner* — Kyle Vallecillo
(74) *Attorney, Agent, or Firm* — Coats & Bennett, PLLC (57) ABSTRACT

A radio node (52) in a wireless communication system (10) employs multiple different candidate formats (22) that define different possible positions of decoding checks (24) within a transport block of a specific size. The radio node (52) determines, from these different candidate formats (22), a format that defines a position of decoding checks (24) within a transport block (16) to be encoded or decoded. The radio node (52) then encodes or decodes at least a portion of the transport block (16) based on the determined format.

22 Claims, 7 Drawing Sheets

(56) References Cited

U.S. PATENT DOCUMENTS

| | | | |
|---|---|---|---|
| 2010/0034092 A1* | 2/2010 | Krishnamurthy | H04W 56/00 370/241 |
| 2010/0118856 A1* | 5/2010 | Krishnamurthy | H04L 1/0026 370/342 |
| 2014/0369294 A1* | 12/2014 | Seo | H04W 76/10 370/329 |
| 2015/0181576 A1* | 6/2015 | Papasakellariou | H04L 5/0053 370/329 |
| 2015/0381209 A1 | 12/2015 | Roh et al. | |
| 2016/0100422 A1* | 4/2016 | Papasakellariou | H04L 1/1861 370/329 |
| 2016/0233978 A1* | 8/2016 | Kim | H03M 13/1171 |
| 2017/0041923 A1* | 2/2017 | Park | H04L 1/1822 |
| 2017/0289936 A1* | 10/2017 | Chae | H04L 27/26 |
| 2018/0227953 A1* | 8/2018 | Kusashima | H04J 1/00 |
| 2018/0307555 A1* | 10/2018 | Zwart | H04L 1/0045 |

* cited by examiner

CHECK POSITIONS WITHIN A TRANSPORT BLOCK

TECHNICAL FIELD

The present disclosure generally relates to a wireless communication system, and specifically relates to encoding or decoding within the wireless communication system.

BACKGROUND

In a wireless communication system, a transmitter transmits a set of one or more transport blocks (TBs) within each of multiple so-called transmission time intervals (TTIs). A TTI is thereby the inter-arrival time of transport block sets, e.g., at the physical layer as received from the media access control (MAC) layer. A receiver correspondingly receives a set of one or more transport blocks within each TTI. That said, noisy or otherwise unreliable radio channels threaten to produce decoding errors at the receiver. The transmitter aims to enable the receiver to detect those decoding errors by inserting a decoding check within a transport block. The transmitter may, for example, implement a decoding check by generating a hash (e.g., a cyclic redundancy check, CRC) over the transport block's data and appending that hash onto the transport block. The receiver may then independently generate the hash over the transport block's data and detect decoding errors based on whether the independently generated hash matches the received hash.

After inserting a decoding check within a transport block, the transmitter may then channel encode that transport block. The transmitter may for example apply turbo coding or some other forward error correction (FEC) coding to the transport block. This way, the receiver can first attempt to correct decoding errors in the received transport block, and then use the decoding check to detect whether any decoding errors remain.

The transmitter may however segment a transport block into smaller so-called code blocks before channel encoding, e.g., if the transport block is larger than the block size supported by the channel encoder. This segmentation may reduce memory requirements of the channel encoder, without compromising coding gain. Regardless, with a transport block segmented into multiple code blocks, the transmitter generates a decoding check for each individual code block and appends the decoding checks onto the ends of the respective code blocks. The transmitter then channel encodes each individual code block. In this way, segmentation effectively provides multiple decoding checks within a transport block.

Known approaches statically define the number and size of code blocks into which a transport block is segmented, based solely on the size of that transport block. These approaches do so in a way such that a transport block is always segmented into the smallest number of equally sized code blocks possible. This keeps the code blocks as large as possible with the aim of achieving maximum decoding performance. Segmenting a transport block in this way, however, effectively means that decoding checks are statically confined to predefined positions within a transport block of a specific size.

SUMMARY

One or more embodiments herein employ multiple different candidate formats that define different possible positions of decoding checks within a transport block of a specific size. Some embodiments may therefore dynamically adapt the placement of decoding checks within transport blocks of the same size, e.g., as needed based on channel state information. In the context of code block segmentation, the different candidate formats may define different possible sizes and/or numbers of code blocks for a transport block of a specific size. Regardless, defining different possible decoding check positions in this way may for example advantageously allow the receiver to partially decode a transport block and use that decoded data as demodulation reference symbols for decoding a subsequent part of the transport block.

More particularly, embodiments herein include a method performed by a radio node in a wireless communication system. The method comprises determining, from multiple different candidate formats that define different possible positions of decoding checks within a transport block of a specific size, a format that defines a position of decoding checks within a transport block to be encoded or decoded. The method further comprises encoding or decoding at least a portion of the transport block based on the determined format.

In some embodiments, the method comprises dynamically switching between different candidate formats for encoding or decoding transport blocks of the specific size. In this case, the switching may even occur on a transport block by transport block basis.

The method's determining may be determined in any number of ways. For example, the method may comprise determining the format based on (i) channel state information associated with a channel over which the transport block is to be transmitted or received; (ii) a channel coherence time associated with a channel over which the transport block is to be transmitted or received; (iii) a frequency band over which the transport block is to be transmitted or received; and/or (iv) an amount, type, or priority of data conveyed by the transport block of the specific size.

Regardless, the method may comprise transmitting or receiving signaling that indicates the determined format. In this case, the signaling may explicitly indicate the determined format. Whether or not explicitly indicated, though, the signaling may comprise a downlink control information message that also indicates scheduling of the transport block. Alternatively, the signaling may comprise a radio resource control (RRC) message or a media access control (MAC) message.

In any of these embodiments, the determined format may define a position of a decoding check as being substantially adjacent to control data in the transport block. In this case, the control data may comprise a medium access control (MAC) control element.

In some embodiments, at least one of the candidate formats defines multiple decoding checks interspersed in position across a transport block of the specific size.

In some embodiments, each of one or more decoding checks within the transport block provides decoding error checking for a respective one of one or more data portions of the transport block. In this case, the method may further comprise mapping or de-mapping the encoded transport block onto or from physical resource elements, based on each physical resource element containing data from a single one of the one or more data portions of the transport block.

Alternatively or additionally, the method may comprise decoding a portion of the transport block up to a decoding check defined at an intermediate position within the transport block, using the decoding check to check whether the portion of the transport block was decoded correctly, and, if the portion of the transport block was decoded correctly, using the decoded portion of the transport block as demodulation reference symbols for demodulation of data in one or more subsequent portions of the transport block.

In some embodiments, the method may comprise determining, based on the determined format and from multiple different candidate configurations that define different possible positions of non-data demodulation reference symbols within a transport block of the specific size, a configuration that defines a position of non-data demodulation reference symbols within the transport block to be encoded or decoded, and encoding or decoding at least a portion of the transport block based on the determined configuration. In this case, the multiple different configurations may define more sparsely positioned non-data demodulation reference symbols when decoded data from the transport block is usable as demodulation reference symbols than when decoded data from the transport block is not usable as demodulation reference symbols.

In any of these embodiments, a portion of the transport block may be positioned after a decoding check within the transport block and either convey no data or convey data at a reduced transmit power as compared to a portion of the transport block positioned before that decoding check.

In any event, the method may further comprise transmitting or receiving signaling indicating which portions of the transport block are to be decoded.

Alternatively or additionally, the transport block may comprise one or more portions, with each portion being a code block. In this case, each decoding check may be positioned at an end of a respective code block.

In some embodiments, encoding or decoding comprises performing code block segmentation or desegmentation based on the determined format and encoding or decoding one or more code blocks of the transport block. In this case, the multiple different candidate formats may define different possible sizes and/or numbers of code blocks for a transport block of the specific size.

Embodiments herein also include corresponding apparatus, computer programs, and carriers (e.g., computer program products).

DETAILED DESCRIPTION

Figure 1:
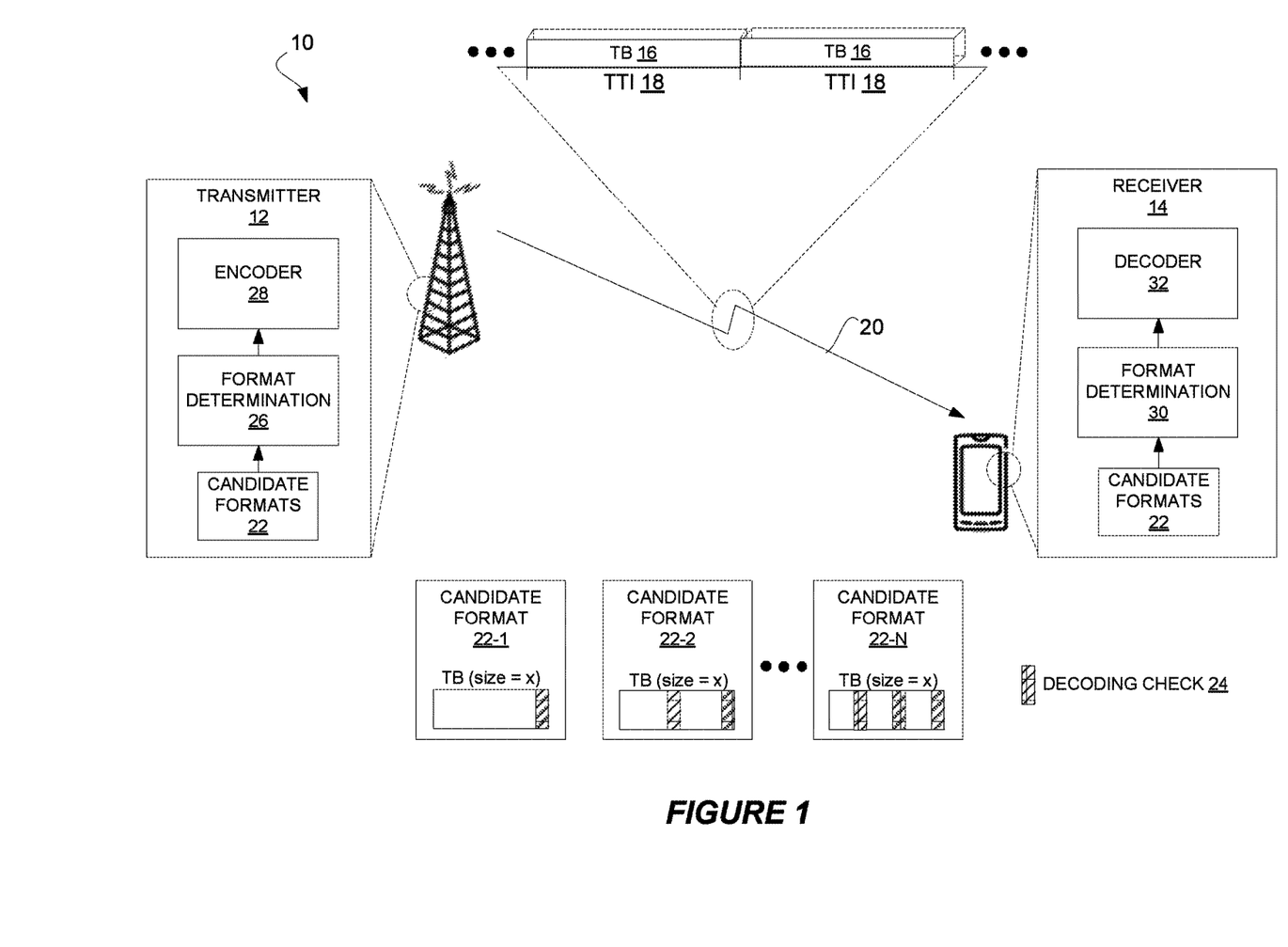
FIG. 1 is a block diagram of a wireless communication system according to one or more embodiments.

FIG. 1 illustrates a wireless communication system 10 according to one or more embodiments. The system 10 includes a transmitter 12 illustrated in the form of a base station. The system 10 also includes a receiver 14 illustrated in the form of a wireless device (e.g., a user equipment). The transmitter 12 is configured to transmit a set of one or more transport blocks 16 to the receiver 14 within each of multiple transmission time intervals (TTIs) 18. In some embodiments, for example, a media access control (MAC) layer at the transmitter 12 sends a set of one or more transport blocks 16 to a physical layer at the transmitter 12 for transmission during each TTI 18. A TTI may for instance correspond to one subframe of length 1 ms in certain embodiments, e.g., based on Long Term Evolution (LTE).

Regardless, the transmitter 12 performs transmission to the receiver 14 over a radio channel 20. The noisy or otherwise unreliable nature of the radio channel 20 threatens to produce decoding errors at the receiver 14. The transmitter 12 therefore includes decoding checks (e.g., CRCs) within transport blocks 16, to enable the receiver 14 to detect decoding errors.

Notably, embodiments in this regard employ multiple different candidate formats 22 that define different possible positions of decoding checks 24 within a transport block 16 of a specific size. FIG. 1 shows, for example, multiple different candidate formats 22-1, 22-2, . . . 22-N for any given transport block 16 of size x. Candidate format 22-1 positions a single decoding check 24 at the end of such a transport block 16. Candidate format 22-2, by contrast, positions one decoding check 24 at the end of a transport block 16 of that same size x, as well as one decoding check 24 at an intermediate position in the transport block 16. And candidate format 22-N positions not only one decoding check 24 at the end of a transport block 16 of size x, but also two decoding checks 24 at different intermediate positions in the transport block 16. Candidate formats 22-2 and 22-N therefore each define multiple decoding checks 24 interspersed in position across any given transport block 16 of size x, but define at least some of those decoding checks 24 to be at different positions. Accordingly, rather than decoding checks being statically confined to predefined positions within any given transport block 16 of size x, decoding checks are adjustable in position within any given transport block 16 of size x by way of the multiple different candidate formats 22 for such a transport block 16.

The transmitter 12 in FIG. 1 exploits these multiple different candidate formats 22 at its disposal in order to encode a transport block. In some embodiments, for example, the transmitter 12 implements format determination 26 for determining from those formats 22 a format that defines a position of decoding checks 24 within a transport block 16 to be encoded. The transmitter 12 encodes the transport block 16 based on this determined format. The transmitter 12 may then transmit the encoded transport block 16 to the receiver 14 within a TTI 18 and over the radio channel 20.

Correspondingly, the receiver 14 in FIG. 1 exploits the multiple different candidate formats 22 in order to decode a received transport block 16. In some embodiments, for example, the receiver 14 implements format determination 30 for determining from those formats 22 a format that defines a position of decoding checks 24 within the transport block 16 to be decoded. The receiver 14 decodes at least a portion of the transport block 16 based on this determined format.

Figure 2:
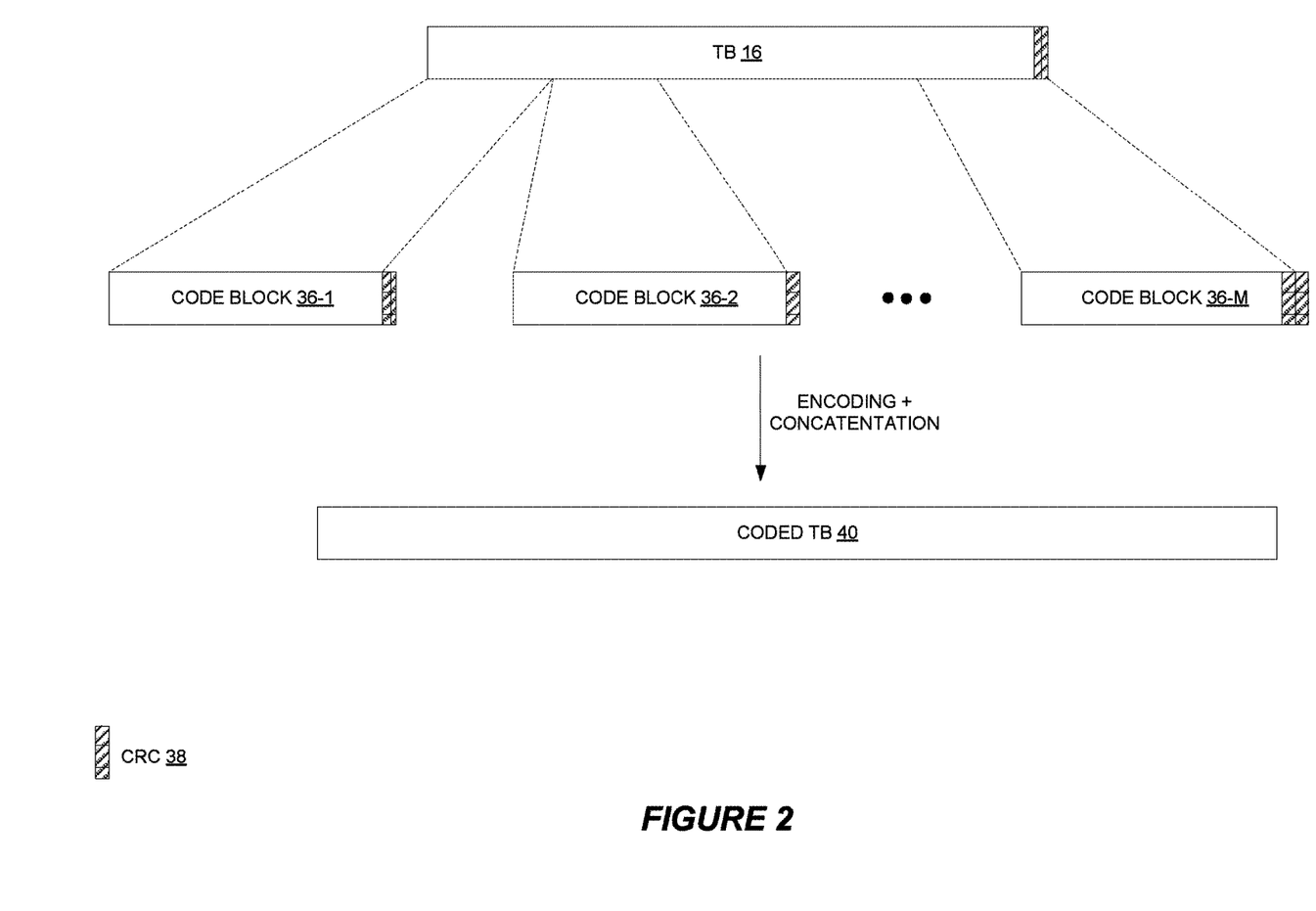
FIG. 2 is a block diagram of transport block segmentation and encoding according to one or more embodiments.

More particularly in some contexts, the transmitter 12 may be configured to segment a transport block 16 into smaller code blocks before channel encoding, e.g., if the transport block 16 is larger than a block size supported by the channel encoder. As shown in FIG. 2, for instance, the transmitter 12 may segment a transport block 16 into M code blocks 36-1, 36-2, . . . 36-M. The transmitter 12 may then generate a decoding check (e.g., in the form of a cyclic redundancy check, CRC, 38) for each individual code block 36 and append the decoding checks onto the ends of the respective code blocks 36. The transmitter 12 then channel encodes each individual code block (e.g., using a turbo code, a low-density parity check, LDPC, code, or some other inherent non-sequential code) and concatenates the coded code blocks (e.g., after rate matching) to obtain a coded transport block 40 for transmission to the receiver 14. Correspondingly, the receiver 14 de-segments the received coded bit sequence 40 into M coded blocks and performs channel decoding. The receiver 14 then detects whether each of the M coded blocks were decoded without error, using the decoding checks (e.g., CRCs 38) appended onto the end of the M decoded blocks.

Figure 3:
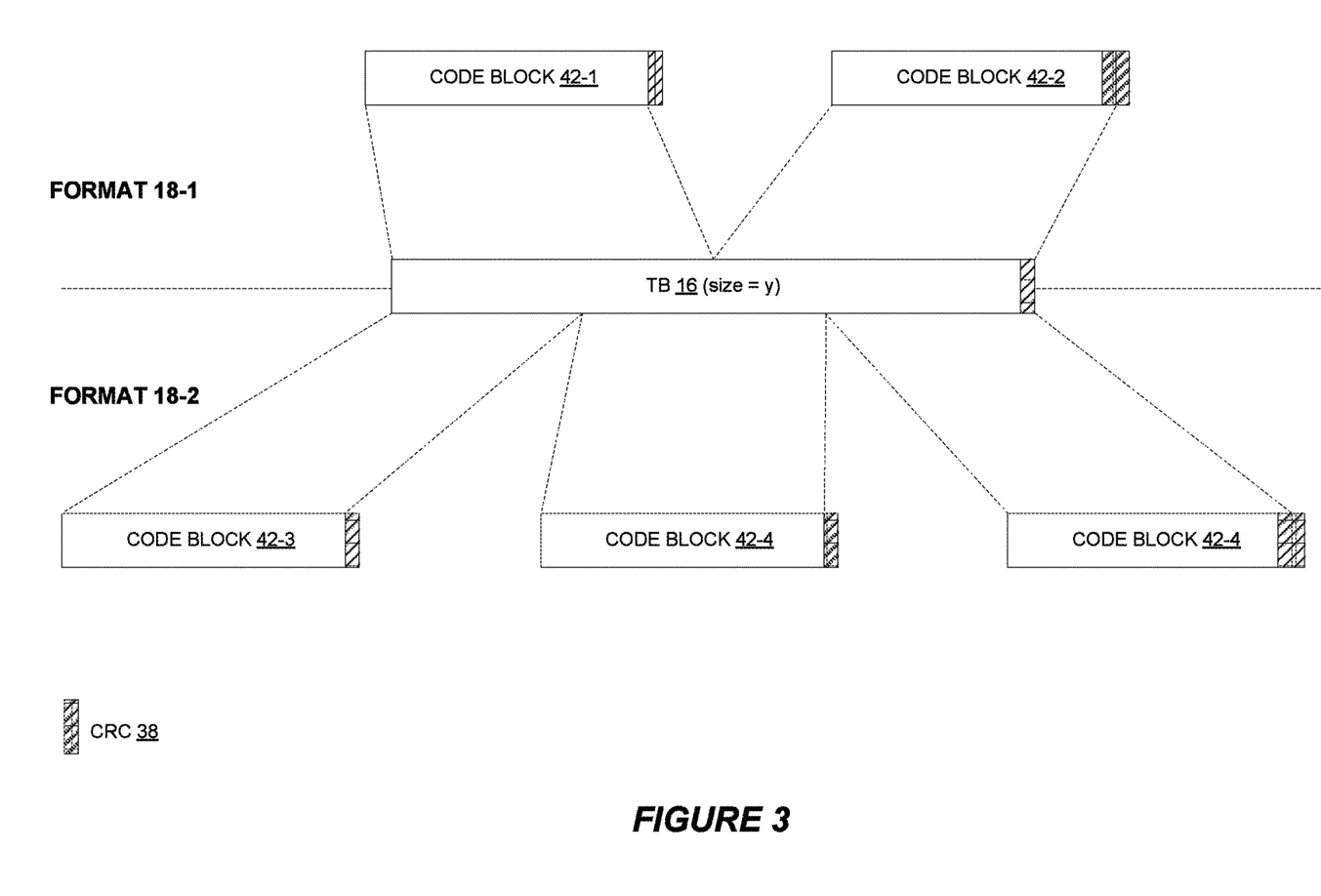
FIG. 3 is a block diagram of different decoding check formats for a transport block that is segmented, according to one or more embodiments.

In this context of code block segmentation, the different candidate formats may effectively define different possible sizes and/or numbers of code blocks for a transport block 16 of a specific size. As shown in FIG. 3, for example, format 18-1 may define that any given transport block 16 of a specific size y is segmented into two code blocks 30-1 and 30-2 of equal size. By contrast, format 18-2 may define that any given transport block 16 of that same size y is segmented into three code blocks 30-3, 30-4, and 30-5 of equal size. In this way, the number and/or size of the code blocks 30 into which a transport block of a specific size is segmented may vary by way of format selection.

Figure 4:
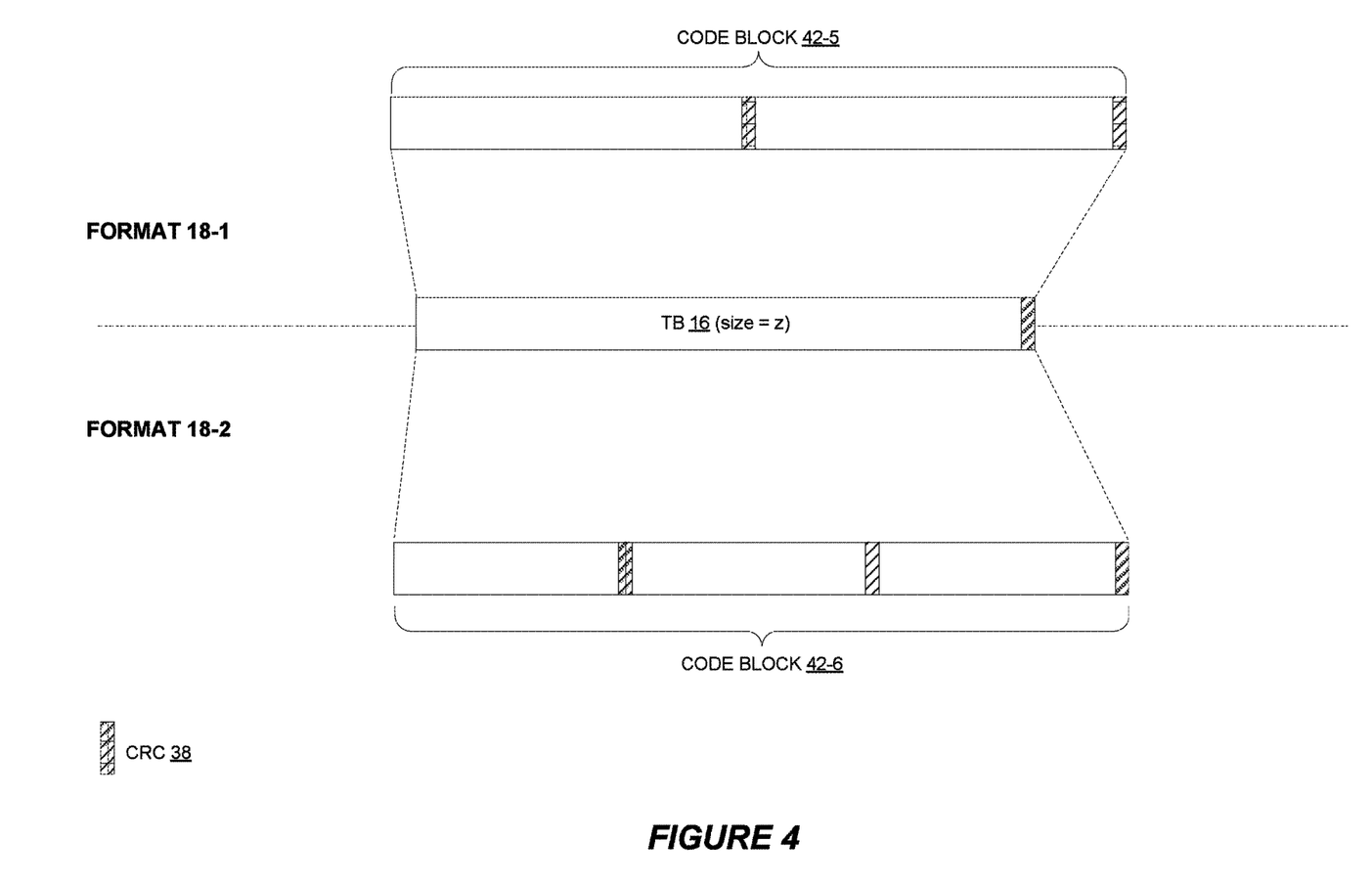
FIG. 4 is a block diagram of different decoding check formats for a transport block that is not segmented, according to one or more embodiments.

In other contexts, though, the transmitter 12 may be configured to transmit a transport block 16 as a single code block, i.e., no segmentation of the transport block 16 occurs. In this case, the different candidate formats may define different possible positions of decoding checks (e.g., CRCs) within that single code block. As shown in FIG. 4, for example, format 18-1 may define that any given transport block 16 of a specific size z is channel encoded as a single code block 42-5, with one decoding check positioned at the end of the code block 42-5 and one decoding check located at an intermediate position in the code block 42-5. By contrast, format 18-2 may define that any given transport block 16 of the same specific size z is channel encoded as a single code block 42-5, with one decoding check positioned at the end of the code block 42-5 and two decoding checks located at different intermediate positions in the code block 42-5. In this way, the position of decoding checks within a single code block may vary by way of format selection.

In some embodiments, the transmitter 12 performs format selection as needed to allow the receiver 14 to selectively use a portion of a transport block 16 early on the decoding process, e.g., before subsequent portions of the transport block 16 are decoded. This selectively used portion may be for instance one of multiple code blocks into which the transport block 16 is segmented (e.g., as in FIG. 3), or one of multiple parts of a single code block where no segmentation occurs (e.g., as in FIG. 4). More particularly, therefore, the receiver 14 may use a decoding check to verify that decoding of a code block (e.g., as in FIG. 3) or a portion of a code block (e.g., as in FIG. 4) occurred without error. Once this decoding check passes, the receiver 14 may release the decoded code block or code block portion from the channel decoder for further processing by the receiver 14, without waiting for the rest of the code blocks or code block portions to be decoded.

In some embodiments, format selection governs or otherwise dictates mapping of the encoded transport block onto physical radio resources (e.g., time-frequency resources). In this case, the transmitter 12 may perform format selection as needed to ensure that the encoded transport block is mapped onto certain physical radio resources that allow or otherwise facilitate early use of a transport block portion.

Consider for instance embodiments where the transmitter 12 maps the encoded transport block onto one or more defined physical resource elements. In this case, the transmitter 12 may perform format selection as needed to ensure that each physical resource element contains data associated with a single decoding check. Where each of one or more decoding checks within the transport block provides decoding error checking for a respective one of one or more data portions of the transport block, this means that each physical resource element contains data from a single one of the one or more data portions of the transport block. Format selection in this way advantageously enables the receiver 14 in some embodiments to use a decoding check in a physical resource element in order to check all data in that physical resource element, without resort to data in a subsequent physical resource element.

Figure 5A:
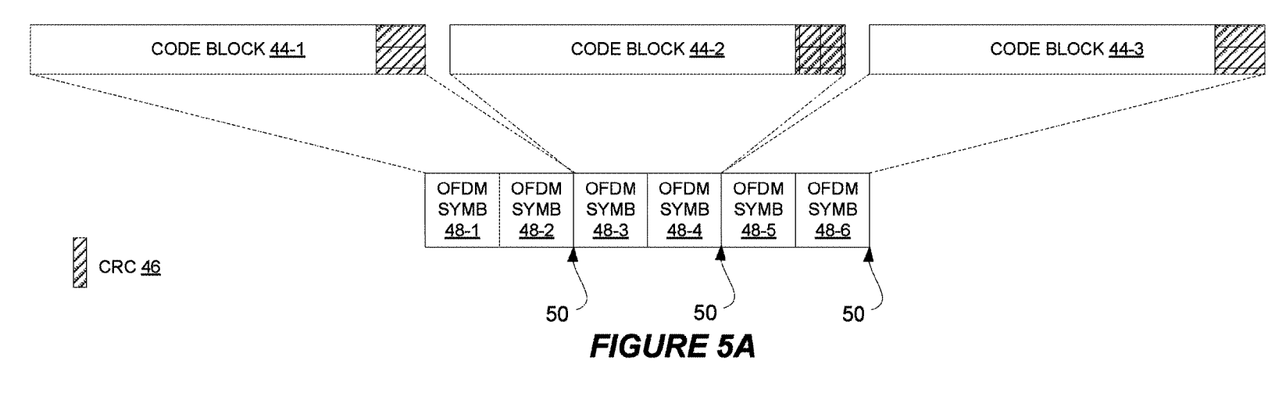
FIGS. 5A-5B are block diagrams of physical resource element mapping according to one or more embodiments.
Figure 5B:
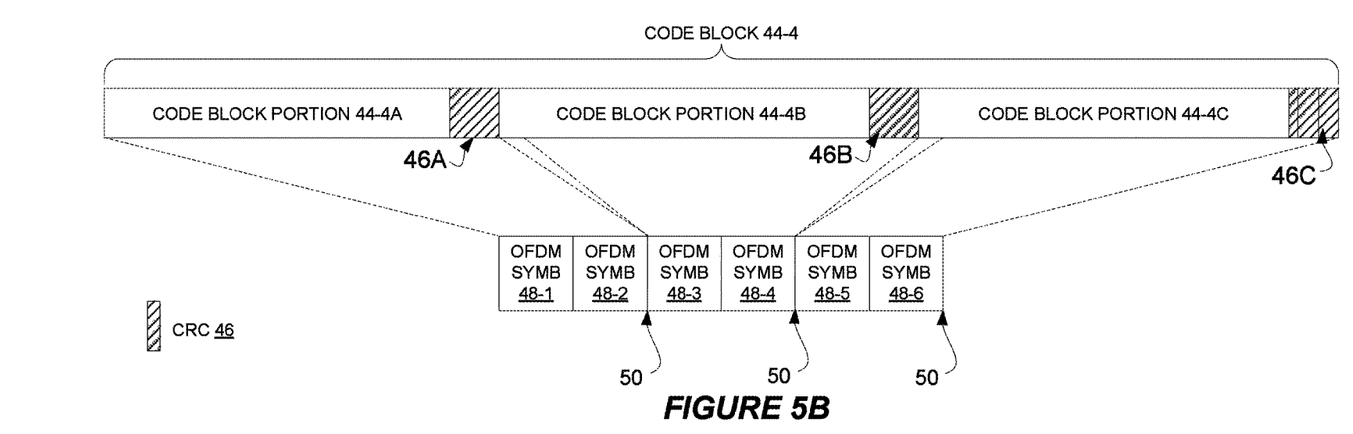

Consider for example embodiments illustrated in FIGS. 5A-5B where a physical resource element corresponds to one OFDM symbol in the time domain (and one subcarrier in the frequency domain). As shown in FIG. 5A, the transmitter 12 segments a transport block 16 into three code blocks 44-1, 44-2, and 44-3, with CRCs 46 appended onto the ends of those code blocks. The transmitter 12 encodes the code blocks individually, e.g., using a channel code with a non-sequential structure, such as a turbo code or low-density parity check (LDPC) code. The transmitter 12 then concatenates the coded code blocks to form a coded transport block. The transmitter 12 performs format selection as needed to map the coded transport block to OFDM symbols 48-1, 48-2, . . . 48-6 such that each OFDM symbol contains data associated with a single CRC 46. In fact, each OFDM symbol contains data from a single one of the code blocks. Specifically, OFDM symbols 48-1 and 48-2 each contain only data from code block 44-1, OFDM symbols 48-3 and 48-4 each contain only data from code block 44-2, and OFDM symbols 48-5 and 48-6 each contain only data from code block 44-3. In some embodiments, this enables the receiver 14 to use a CRC in an OFDM symbol in order to check all data in that OFDM symbol, without resort to data in a subsequent OFDM symbol. Ignoring the effect of any intermediate interleaving, etc., this may be because CRCs 46 are aligned with OFDM symbol boundaries 50 and/or because any given code block spans an integer number of OFDM symbols.

FIG. 5B illustrates a similar feature when the transmitter 12 transmits a transport block 16 as a single code block 44-4, rather than segmenting the transport block 16 into multiple code blocks. The transmitter 12 may encode the single code block 44-4 for instance using a sequential channel code, such as a polar code or a convolutional code. In this example, the transmitter 16 intersperses CRCs 46 in positions across the single code block 44-4 such that decoding of different portions 44-4A, 44-4B, and 44-4C of the code block 44-4 is checkable with respective CRCs 46A, 46B, and 46C. The transmitter 16 in this regard positions the CRCs 46 and/or maps the coded transport block to OFDM symbols 48-1, 48-2, . . . 48-6 such that each OFDM symbol contains data associated with a single CRC 46. In fact, each OFDM symbol contains data from a single code block portion. Specifically, OFDM symbols 48-1 and 48-2 each contain only data from code block portion 44-4A, OFDM symbols 48-3 and 48-4 each contain only data from code block portion 44-4B, and OFDM symbols 48-5 and 48-5 each contain only data from code block portion 44-4C. In some embodiments, this enables the receiver 14 to use a CRC in an OFDM symbol in order to check all data in that OFDM symbol, without resort to data in a subsequent OFDM symbol. Ignoring the effect of any intermediate interleaving, etc., this may be because CRCs 46 are aligned with OFDM symbol boundaries 50 and/or because any given code block portion spans an integer number of OFDM symbols.

In any event, the receiver 14 may selectively use a portion of a transport block 16 early on in the decoding process, for any number of purposes. In some embodiments, for example, the receiver 14 exploits data from a correctly decoded portion of the transport block 16 as demodulation reference symbols (DMRS) for demodulation of data in one or more subsequent portions of the transport block 16. That is, the receiver 14 treats the correctly decoded data portion as known reference symbols, similar to treating conventional DMRS as known reference symbols, to assist with demodulation and thereby improve its reliability. Because the decoded data itself serves as demodulation reference symbols, this data may be appropriately referred to as data-DMRS so as to distinguish from conventional non-data DMRS. Regardless, the receiver 14 in this way may use correctly received data in the beginning of a TTI to facilitate channel tracking until the end of the TTI, e.g., if the channel is not constant during the TTI (such as when the receiver 14 is traveling at high speed).

Alternatively or additionally, a portion of the transport block 16 selectively used early on in the decoding process may comprise control data. That is, the receiver 14 may selectively extract control data that is positioned substantially adjacent (e.g., immediately or close before) a decoding check, e.g., if that decoding check indicates the control data is decoded correctly. This control data may be for instance a media access control (MAC) message or a radio resource control (RRC) message. As just one example, the control data may indicate how the receiver 14 is to perform additional mobility measurements, e.g., in the context of cell-center wireless devices for which additional mobility measurements are not needed, user-plane data may be transmitted instead of control data. No matter the particular content, though, the transmitter 12 generally may multiplex any information with low delay requirements (e.g., control data) on a data channel in an efficient manner.

In still other embodiments, the receiver 14 additionally or alternatively selectively uses a portion of the transport block 16 early on in the decoding process to implement decoding pipelining. That is, the receiver 14 pipelines decoding of different portions of the transport block 16.

In yet other embodiments, the transmitter 12 performs format selection as needed in order to terminate transmission of a transport block 16 early or to reduce the power of a tail-end portion of the transport block 16. This may correspondingly allow the transmitter 12 and/or receiver 14 to conserve power. For example, in some embodiments, the transmitter 12 transmits data of the transport block 16 up to one of the decoding checks. The transmitter 12 refrains from transmitting data of the data block 16 after that decoding check, or sends such data with reduced power, i.e., implements discontinuous transmission (DTX). Likewise, the receiver 14 may refrain from receiving data of the data block 16 after a particular decoding check, i.e., implements discontinuous reception (DRX).

In some embodiments, the transmitter 12, therefore, transmits to the receiver 14 signaling indicating which portions of the transport block 16 are to be decoded. For instance, data in an earlier part of the transport block 16 covered by an earlier decoding check may contain an indication of whether later parts of the transport block 16 need to be decoded. Especially in the context of uplink transmission from a wireless device, this may save power in the transmitter 12, e.g., if the buffer status is unclear to the receiver 14, where the transmitter 12 can terminate the transmission early if the buffer is smaller than the assigned transmission resource.

In one embodiment, though, the transmitter 12 selectively implements format selection in this way, e.g., to insert intermediate decoding checks in the transport block 16, only when the receiver 14 is capable of using a portion of the transport block 16 early in the decoding process. The receiver 14 in some embodiments is therefore configured to transmit signaling to the transmitter 12 indicating its capability and/or availability for early use of a transport block portion.

In any event, note that the transmitter 12 and receiver 14 may dynamically switch between different candidate formats for encoding or decoding transport blocks of a specific size. This switching may even occur on a transport block by transport block basis. In some embodiments, for example, the transmitter 12 performs link adaptation exploiting the multiple different candidate formats available. The transmitter 12 may for instance decide which format to use, e.g., on a transport block by transport block basis, based on effectively weighing the gain in channel estimation attributable to a greater number of decoding checks versus the loss in coding gain attributable to a fewer number of decoding checks.

Also note that the transmitter 12 and receiver 14 may perform their respective format determination in any number of ways. In some embodiments, for example, the transmitter 12 and/or receiver 14 may dynamically determine the format to use based on channel state information (CSI) associated with the radio channel 20 over which the transport block 16 is to be transmitted. This CSI may be sent by the receiver 14 as CSI feedback (e.g., in the form of a channel quality indicator, CQI, or the like). No matter the particular form of the CSI, for instance, the CSI may indicate (or the transmitter 12 may derive from the CSI) a channel coherence time associated with the radio channel 20 over which the transport block 16 is to be transmitted. The channel coherence time may be relatively short for example for high speed receivers for which the radio channel 20 is not constant during a TTI. The transmitter 12 and/or receiver 14 may determine to use a format with a relatively higher density of decoding checks in the transport block 16 when the channel coherence time is relatively short, whereas the transmitter 12 and/or receiver 14 may determine to use a format with a relatively sparser density of decoding checks in the transport block 16 when the channel coherence time is relatively long. A relatively higher density of decoding checks may for example allow the receiver 14 to use correctly decoded portions of the transport block 16 as demodulation reference symbols, as described above. In this way, high speed receivers 14 may use correctly received bits in the beginning of the TTI to facilitate channel tracking until the end of the TTI.

Moreover, in some embodiments, the density of the decoding checks is associated with the density of non-data demodulation reference symbols. For instance, different candidate non-data DMRS configurations may define different possible positions of non-data DMRS within a transport block 16 of a specific size. The configurations may depend on the positions of decoding checks within the transport block 16 of the specific size, e.g., in the sense that only certain pairings of non-data DMRS configurations and decoding check formats are possible. The configurations may for example define more sparsely positioned non-data DMRS when decoding checks are more densely positioned (e.g., thereby enabling decoded data to be used as more densely positioned data DMRS). Conversely, the configurations may define more densely positioned non-data DMRS when decoding checks are more sparsely positioned. The configurations may be receiver-specific or receiver-independent, and may be static (e.g., based on a predetermined "contract"), dynamic, or semi-statically configurable. Regardless, the transmitter 12 and/or receiver 14 may determine, based on the determined decoding check format and from the different non-data DMRS configurations, a configuration that defines a position of non-data DMRS within the transport block 16. The transmitter 12 and/or receiver 14 may then encode or decode at least a portion of the transport block 16 based on the determined configuration.

In any event, the transmitter 12 and receiver 14 in CSI-based embodiments may accordingly determine the decoding check format based on signaling that explicitly or implicitly indicates the CSI. In some embodiments, for instance, the transmitter 12 receives explicit CSI from the receiver 14 and determines the decoding check format based on that signaling. In other embodiments, though, the CSI may be implicitly signaled by signaling indicating explicit characteristics of the radio channel 20. For example, signaling may indicate a frequency band over which the transport block 16 is to be transmitted or receiver. This signaling may implicitly indicate certain (assumed) CSI. The frequency band signaled may for instance be associated with certain types of spectrum (e.g., unlicensed spectrum) that has known characteristics in terms of CSI.

Similarly, the transmitter 12 and/or receiver 14 may determine the decoding check format based on a transmission mode used for the transport block 16. An example of the transmission mode in this context may be that the transport block 16 is transmitted over unsilenced spectrum. This transmission mode may therefore correspond to a general transmission mode of the transmitter 12 and/or receiver 14, i.e., not specific to a particular transport block 16 per se.

Alternatively or additionally, the transmitter 12 and/or receiver 14 may determine the decoding check format based on an amount, type, or priority of data conveyed by the transport block 16 of the specific size. As alluded to above, for instance, the decoding check positioning may be used for early extraction of control data. In some embodiments, therefore, the transmitter 12 and/or receiver 14 determine the decoding check format based on which type of data (e.g., control data or user-data) is conveyed by the transport block 16. Also as alluded to above, the decoding check position may be used for early termination of a transmission. Accordingly, in some embodiments, the transmitter 12 and/or receiver 14 may determine the decoding check format based on an amount of data conveyed by the transport block 16 (e.g., using a buffer status of the transmitter 12).

In any or all of these embodiments, the transmitter 12 may transmit signaling to the receiver 14 indicating the determined decoding check format. The transmitter 12 may for instance autonomously determine the format, e.g., based on CSI feedback from the receiver 14, and transmit signaling indicating the determined format to the receiver 14. Autonomous format determination may be performed even in uplink transmission embodiments where the transmitter 12 is a wireless device. In any event, the signaling may explicitly indicate the determined format in some embodiments. For example, the signaling may comprise a downlink control information (DCI) message, e.g., which also indicates scheduling of the transport block 16. In this case, a DCI message may indicate a decoding check format using certain bits in a DCI message. Alternatively or additionally, the signaling may indicate the decoding check format by indicating a certain transport format for the transport block 16 (e.g., different entries in the transport format table correspond to different decoding check formats). In still other embodiments, the transmitter 12 may signal the determined format to the receiver 14 using a radio resource control (RRC) message or a media access control (MAC) message. The receiver 14 may therefore receive the signaling in some embodiments as configuration signaling, e.g., even before it receives a DCI message scheduling or assigning the transmission.

In still other embodiments, though, the receiver 14 may blindly determine the decoding check format. The receiver 14 may for instance blindly test one or more hypotheses regarding decoding check positions within a received transport block 16. e.g., according to one or more criteria. The receiver 14 may for instance attempt to decode portions of the transport block 16 and check that decoding using decoding checks assumed to be positioned according to different hypothesized ones of the candidate formats. The receiver 14 may determine that the decoding format used is whichever format reveals the greatest number of successful decoding checks (e.g., for a wrong hypothesis, the number of successful decoding checks is mostly zero).

No matter how the receiver 14 determines the decoding check format used, the receiver 14 generally needs more information than just the size of the transport block 16 in order to determine the decoding check format used. This is because, rather than the decoding check positions being entirely dictated by the size of the transport block 16, the decoding check positions may vary between transport blocks of the same size, e.g., on a block by block basis, subframe by subframe basis, frame by frame basis, etc.

In some embodiments, the receiver 14 may condition early use of transport block portion(s) on which decoding check format is used. In some embodiments, for instance, the decoding format is used as an input parameter to a function in the receiver 14 that determines whether or not to use decoded data portions of the transport block 14 as demodulation reference symbols for demodulation of data portion(s) that follow (e.g., in one or more data symbols that follow). For example, if the determined decoding check format positions decoding checks such that all data symbols in an OFDM symbol can be checked (confirmed or rejected as correctly decoded) without using data in a subsequent OFDM symbol, then the receiver 14 may decide to use the correctly decoded data as demodulation reference symbols for an OFDM symbol that follows. Conversely, if the determined decoding check format positions decoding checks such that all data symbols in an OFDM symbol cannot be checked without using data in a subsequent OFDM symbol, then the receiver 14 may decide to not use the correctly decoded data as demodulation reference symbols for an OFDM symbol that follows.

Note that, although FIG. 1 illustrates embodiments from the perspective of a radio network node transmitting a transport block 16 to a wireless device, embodiments herein equally apply to a wireless device transmitting a transport block to a radio network node. That is, embodiments may be implemented in the downlink, uplink, or both. In some embodiments, therefore, the transmitter 12 herein is a radio network node and the receiver 14 is a wireless device, whereas in other embodiments the transmitter 12 is a wireless device and the receiver 14 is a radio network node.

Figure 6:
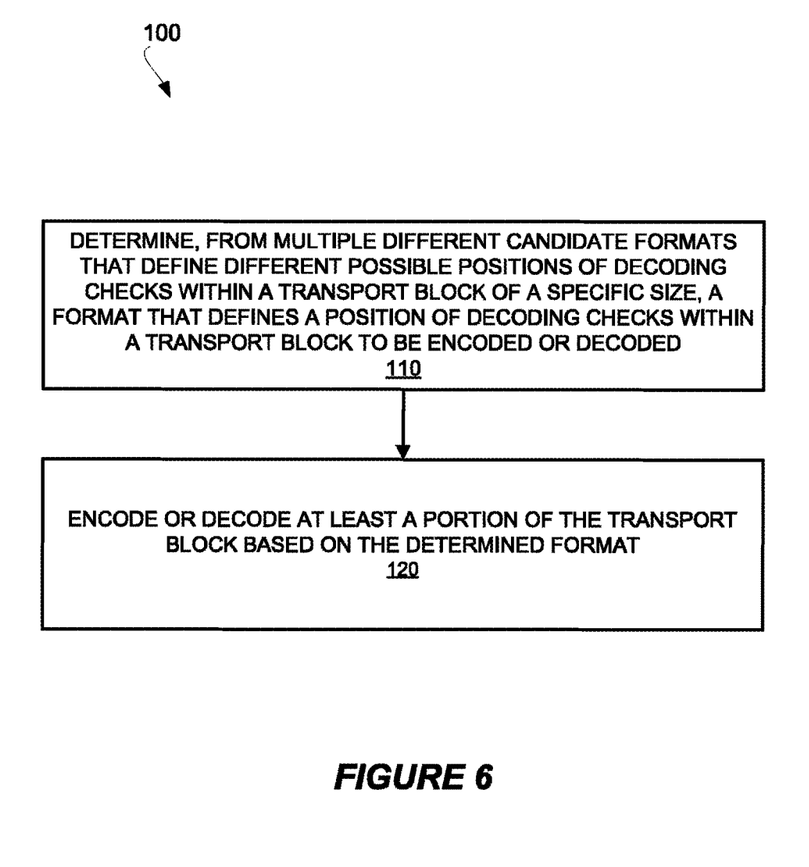
FIG. 6 is a logical flow diagram illustrating a method performed by a radio node according to one or more embodiments.

No matter which node is the transmitter 12 and which node is the receiver 14, though, FIG. 6 illustrates a method 100 performed or initiated by a radio node in a wireless communication system 10. This radio node may be the transmitter 12 in some embodiments and the receiver 14 in other embodiments. In either case, the method 100 performed or initiated by the radio node comprises determining, from multiple different candidate formats 22 that define different possible positions of decoding checks 24 within a transport block of a specific size, a format that defines a position of decoding checks 24 within a transport block 16 to be encoded or decoded (Block 110). The method 100 further comprises encoding or decoding at least a portion of the transport block 16 based on the determined format (Block 120).

For example, where the radio node is a wireless device, the determining in step 110 may be based on receiving a downlink control information message that assigns transmission of the transport block 16 and that (explicitly) indicates the decoding check format. In embodiments where transmission of the transport block 16 is performed in the downlink from a radio network node to the wireless device, the method 100 may further include receiving the transport block 16 and decoding at least a portion of the received transport block 16. Alternatively, in embodiments where transmission of the transport block 16 is performed in the uplink from the wireless device to a radio network node, the method 100 may comprise encoding the transport block 16 according to the determined format and transmitting the encoded transport block 16 to a radio network node (according to the assigning in the downlink control information message).

Note that, although described above with respect to a single transport block, embodiments herein are also extendable to a set of multiple transport blocks. For example, in some embodiments, the multiple different candidate formats 22 may define different possible positions of decoding checks 24 within a set of multiple transport blocks of a specific size. In this case, the node may determine from these candidate formats a format that defines a position of decoding checks within a set of transport blocks to be encoded or decoded. The node may then encode or decode at least a portion of the set of transport blocks based on the determined format.

In view of this, a radio node herein is any type of node (e.g., a radio network node or wireless device) capable of communicating with another node over radio signals. A radio network node is any type of radio node within a wireless communication network, such as a base station. A wireless device is any type of radio node capable of communicating with a radio network node over radio signals. A wireless device may therefore refer to a user equipment (UE), a machine-to-machine (M2M) device, a machine-type communications (MTC) device, a NB-IoT device, etc. However it should be noted that the UE does not necessarily have a "user" in the sense of an individual person owning and/or operating the device. A wireless device may also be referred to as a radio device, a radio communication device, a wireless terminal, or simply a terminal—unless the context indicates otherwise, the use of any of these terms is intended to include device-to-device UEs or devices, machine-type devices or devices capable of machine-to-machine communication, sensors equipped with a wireless device, wireless-enabled table computers, mobile terminals, smart phones, laptop-embedded equipped (LEE), laptop-mounted equipment (LME), USB dongles, wireless customer-premises equipment (CPE), etc. In the discussion herein, the terms machine-to-machine (M2M) device, machine-type communication (MTC) device, wireless sensor, and sensor may also be used. It should be understood that these devices may be UEs, but are generally configured to transmit and/or receive data without direct human interaction.

In an internet of things (IoT) scenario, a wireless device as described herein may be, or may be comprised in, a machine or device that performs monitoring or measurements, and transmits the results of such monitoring measurements to another device or a network. Particular examples of such machines are power meters, industrial machinery, or home or personal appliances, e.g. refrigerators, televisions, personal wearables such as watches etc. In other scenarios, a wireless communication device as described herein may be comprised in a vehicle and may perform monitoring and/or reporting of the vehicle's operational status or other functions associated with the vehicle.

Note that a radio node as described above may perform the method 100 in FIG. 6 and any other processing herein by implementing any functional means or units. In one embodiment, for example, the radio node comprises respective circuits or circuitry configured to perform the steps shown in FIG. 6. The circuits or circuitry in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more processors, carries out the techniques described herein.

Figure 7:
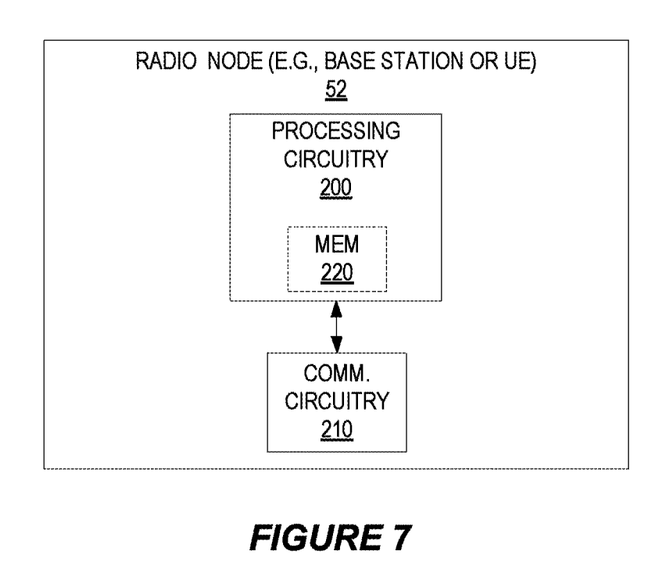
FIG. 7 is a block diagram of a radio node according to one or more embodiments.

FIG. 7 illustrates a radio node 52 implemented in accordance with one or more embodiments. As shown, the radio node 52 includes processing circuitry 200 and communication circuitry 210. The communication circuitry 210 is configured to transmit and/or receive information to and/or from one or more other nodes, e.g., via any communication technology. Such communication may occur via one or more antennas that are either internal or external to the radio node 52. The processing circuitry 200 is configured to perform processing described above, e.g., in FIG. 6, such as by executing instructions stored in memory 220. The processing circuitry 200 in this regard may implement certain functional means, units, or modules.

Figure 8:
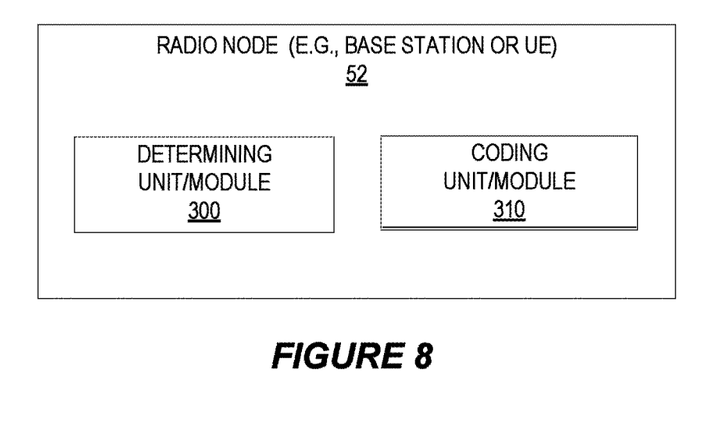
FIG. 8 is a block diagram of a radio node according to one or more other embodiments.

FIG. 8 illustrates a radio node 52 implemented in accordance with one or more other embodiments. As shown, the radio node 52 implements various functional means, units, or modules, e.g., via the processing circuitry 200 in FIG. 7 and/or via software code. These functional means, units, or modules, e.g., for implementing the method in FIG. 6, include for instance a determining unit or module 300 for determining, from multiple different candidate formats 22 that define different possible positions of decoding checks 24 within a transport block of a specific size, a format that defines a position of decoding checks 24 within a transport block 16 to be encoded or decoded. Also included is an coding unit or module 310 for encoding or decoding at least a portion of the transport block 16 based on the determined format.

Those skilled in the art will also appreciate that embodiments herein further include corresponding computer programs.

A computer program comprises instructions which, when executed on at least one processor of a node, cause the node to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of a node, cause the node to perform as described above.

Embodiments further include a computer program product comprising program code portions for performing the steps of any of the embodiments herein when the computer program product is executed by a computing device. This computer program product may be stored on a computer readable recording medium.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method performed by a radio node in a wireless communication system, the method comprising:
   determining, from multiple different candidate formats that define different possible positions of decoding checks within a transport block of a specific size, a format that defines a position of decoding checks within a transport block to be encoded or decoded; and
   encoding or decoding at least a portion of the transport block based on the determined format;
   wherein the determining comprises determining the format based on channel state information associated with a channel over which the transport block is to be transmitted or received.

2. The method of claim 1, further comprising dynamically switching between different candidate formats for encoding or decoding transport blocks of the specific size.

3. The method of claim 2, wherein the switching occurs on a transport block by transport block basis.

4. A method performed by a radio node in a wireless communication system, the method comprising:
   determining, from multiple different candidate formats that define different possible positions of decoding checks within a transport block of a specific size, a format that defines a position of decoding checks within a transport block to be encoded or decoded; and
   encoding or decoding at least a portion of the transport block based on the determined format;
   wherein the determining comprises determining the format based on a channel coherence time associated with a channel over which the transport block is to be transmitted or received.

5. A method performed by a radio node in a wireless communication system, the method comprising:
   determining, from multiple different candidate formats that define different possible positions of decoding checks within a transport block of a specific size, a format that defines a position of decoding checks within a transport block to be encoded or decoded; and
   encoding or decoding at least a portion of the transport block based on the determined format;
   wherein the determining comprises determining the format based on a frequency band over which the transport block is to be transmitted or received.

6. A method performed by a radio node in a wireless communication system, the method comprising:
   determining, from multiple different candidate formats that define different possible positions of decoding checks within a transport block of a specific size, a format that defines a position of decoding checks within a transport block to be encoded or decoded; and
   encoding or decoding at least a portion of the transport block based on the determined format;
   wherein the determining comprises determining the format based on an amount, type, or priority of data conveyed by the transport block of the specific size.

7. The method of claim 1, further comprising:
   transmitting or receiving signaling based on which the format that defines a position of decoding checks within the transmit block to be encoded or decoded is determined; and
   encoding or decoding at least a portion of the transport block based on the determined format.

8. The method of claim 1, further comprising transmitting or receiving signaling that indicates the determined format.

9. The method of claim 8, wherein the signaling explicitly indicates the determined format.

10. The method of claim 7, wherein the signaling comprises a downlink control information message that also indicates scheduling of the transport block.

11. The method of claim 7, wherein the signaling comprises a radio resource control (RRC) message or a media access control (MAC) message.

12. The method of claim 1, wherein the determined format defines a position of a decoding check as being substantially adjacent to control data in the transport block.

13. The method of claim 12, wherein the control data comprises a medium access control (MAC) control element.

14. The method of claim 1, wherein at least one of the candidate formats defines multiple decoding checks interspersed in position across a transport block of the specific size.

15. The method of claim 1:
   wherein each of one or more decoding checks within the transport block provides decoding error checking for a respective one of one or more data portions of the transport block; and
   wherein the method further comprises mapping or de-mapping the encoded transport block onto or from physical resource elements, based on each physical resource element containing data from a single one of the one or more data portions of the transport block.

16. The method of claim 1, further comprising:
   decoding a portion of the transport block up to a decoding check defined at an intermediate position within the transport block;
   using the decoding check to check whether the portion of the transport block was decoded correctly; and
   if the portion of the transport block was decoded correctly, using the decoded portion of the transport block as demodulation reference symbols for demodulation of data in one or more subsequent portions of the transport block.

17. The method of claim 1, further comprising:
   determining, based on the determined format and from multiple different candidate configurations that define different possible positions of non-data demodulation reference symbols within a transport block of the specific size, a configuration that defines a position of non-data demodulation reference symbols within the transport block to be encoded or decoded; and encoding or decoding at least a portion of the transport block based on the determined configuration.

18. The method of claim 17, wherein the multiple different configurations define more sparsely positioned non-data demodulation reference symbols when decoded data from the transport block is usable as demodulation reference symbols than when decoded data from the transport block is not usable as demodulation reference symbols.

19. The method of claim 1, wherein a portion of the transport block is positioned after a decoding check within the transport block and either conveys no data or conveys data at a reduced transmit power as compared to a portion of the transport block positioned before that decoding check.

20. The method of claim 1, further comprising transmitting or receiving signaling indicating which portions of the transport block are to be decoded.

21. The method of claim 1:
wherein the transport block comprises one or more portions, with each portion being a code block; and
wherein each decoding check is positioned at an end of a respective code block.

22. The method of claim 1:
wherein the encoding or decoding comprises performing code block segmentation or desegmentation based on the determined format and encoding or decoding one or more code blocks of the transport block;
wherein the multiple different candidate formats define different possible sizes and/or numbers of code blocks for a transport block of the specific size.

* * * * *